Dec. 7, 1937.  H. C. PETERSEN  2,101,476
LEAF LOCK FOR OPHTHALMIC MOUNTINGS
Filed May 22, 1936
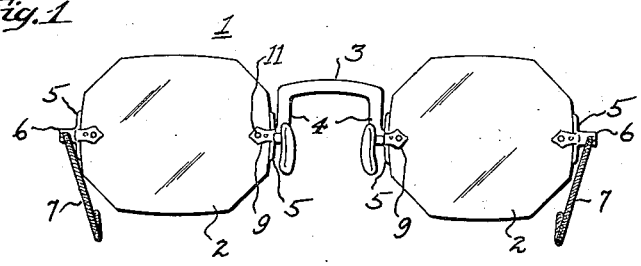
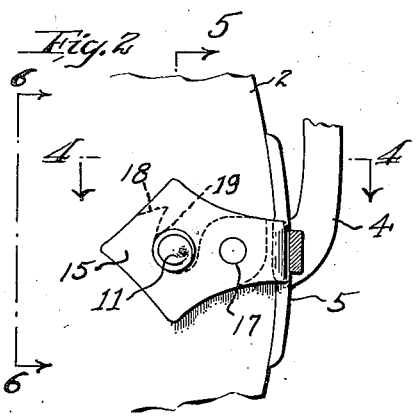
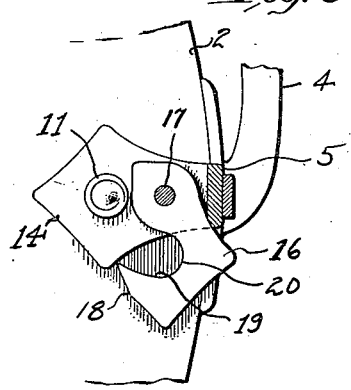
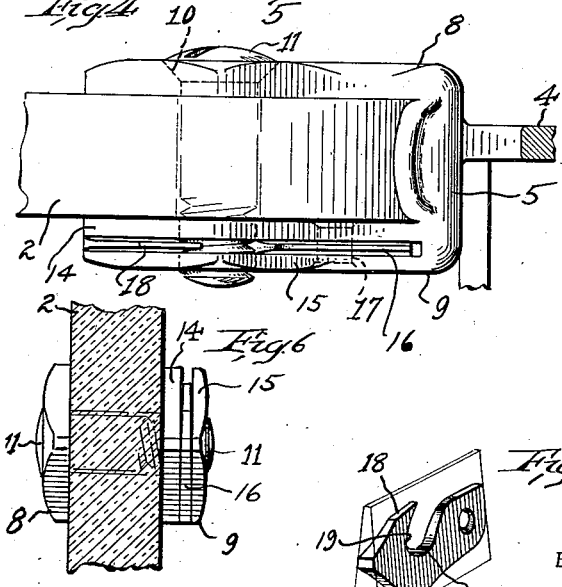
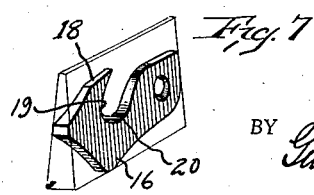
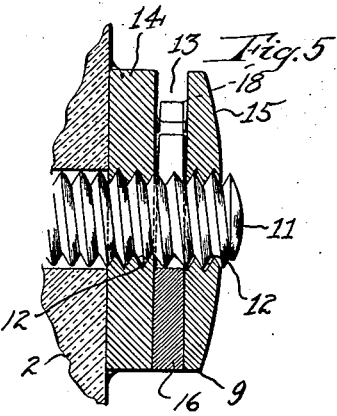
INVENTOR.
Henry C. Petersen,
BY George D. Richards
ATTORNEY.

Patented Dec. 7, 1937

2,101,476

UNITED STATES PATENT OFFICE 2,101,476

LEAF LOCK FOR OPHTHALMIC MOUNTINGS

Henry C. Petersen, Hillside, N. J., assignor to Lowres Optical Manufacturing Co., Newark, N. J., a corporation of New Jersey Application May 22, 1936, Serial No. 81,259

4 Claims. (Cl. 88—47)

This invention relates generally to improvements in ophthalmic mountings and the invention has reference more particularly to the provision of a novel leaf lock for rigidly and permanently connecting the lenses of spectacles and eye-glasses to their supporting means.

Heretofore, in attaching the bridge to the lenses of rimless eye-glasses and also in attaching the temples to the lenses of spectacles, straps have been used that are provided with apertured arms which straddle opposite sides of the lenses, the said arms being adapted to have screws extending through the apertures thereof and through aligned apertures in the lenses. Usually the hole in one arm of each strap is threaded to engage the threads of the screw while the bight portion of such strap engages against the edge of the lens. Considerable care must be exercised in tightening the screw used to hold the lenses to the strap mountings or else the lenses are apt to be broken, for owing to the stiffness of the arms of the straps it is hard to tell just how tight a screw must be adjusted in order to prevent the same from becoming loose and consequent shifting of the lenses. In order to insure the retention of the screw in its initial position, opticians ofttimes thread the screw in too tightly with the result that lenses are broken. On the other hand, unless the screws are tightly engaged, the ordinary handling that the eye-glasses receive in use causes the screws to unscrew somewhat, thereby leading to looseness of the mountings upon the lenses.

The principal object of the present invention is to provide a novel ophthalmic mounting for spectacles and eye-glasses having a leaf lock incorporated therein that is so constructed and arranged as to prevent looseness developing between the lens and its mountings, the said leaf lock serving to prevent the lens screw or fastener from unscrewing or becoming loose.

Another object of the present invention lies in the provision of a novel ophthalmic mounting of the above character wherein the lens strap has one arm thereof slitted for receiving a pivoted leaf lock which serves, by spreading the portions of the strap arm bordering the slit thereof apart, to bind the lens strap arm tightly upon the screw or fastener, thereby preventing the same from developing looseness, while at the same time making it unnecessary to initially thread the screw into the strap arm with undue tightness which might otherwise result in cracking the lens.

Other objects of this invention, not at this time more particularly enumerated, will be clearly understood from the following detailed description of the same.

The invention is clearly illustrated in the accompanying drawing, in which:

Fig. 1 is a view in rear elevation of a pair of spectacles employing the novel leaf lock construction of this invention.

Fig. 2 is an enlarged fragmentary view of a portion of the structure shown in Fig. 1.

Fig. 3 is a view similar to Fig. 2 but with a portion of the strap arm broken away and illustrates the leaf lock before the same has been turned to locking position.

Fig. 4 is an enlarged fragmentary view taken substantially along line 4—4 of Fig. 2.

Fig. 5 is an enlarged fragmentary sectional view taken substantially along line 5—5 of Fig. 2.

Fig. 6 is a fragmentary sectional view taken along line 6—6 of Fig. 2 looking in the direction of the arrows.

Fig. 7 illustrates the general appearance of the leaf lock.

Similar characters of reference are employed in said views to indicate corresponding parts.

Referring now to the several figures of the drawing, the reference numeral 1 designates a pair of spectacles having lenses 2 that are interconnected by the mounting or bridge member 3, as is usual. Bridge member 3 has depending arms or yokes 4 to the lower ends of which are integrally or otherwise connected lens straps 5 that are attached to the lenses 2. The outer edge portions of lenses 2 also have additional lens straps 5 attached thereto which lens straps are secured to yokes 6 having temples 7 hingedly connected thereto.

As is especially shown in Figs. 2 to 6, each of the lens straps 5 is provided with two arms 8 and 9 that are adapted to straddle opposite sides of the lens 2. The arm 8 is shown apertured and countersunk at 10 for receiving the lens screw or fastener 11, the said screw being adapted to extend through an aligned aperture provided in the lens 2 and is screwed into a threaded aperture 12 provided in the lens strap arm 9.

According to the preferred arrangement, the lens strap arm 9 is formed with a vertical slit or slot 13, extending inwardly from the free end portion of this arm almost to the point of the connection of the arm to the body of the lens strap 5. The vertical slit or slot 13 serves to divide the arm 9 into inner and outer arm parts or portions 14 and 15, respectively, each of which portions is threaded for receiving the screw 11.

A leaf lock 16, of approximately wedge shape in cross-section as best illustrated in Fig. 7, is pivotally mounted upon a pin or rivet 17 that extends parallel to the screw 11 and has its end portions fixed in apertures provided in the strap arm portions 14 and 15. The maximum width or thickness of the wedge shape leaf lock 16 is appreciably greater than the normal width of the slit 13, so that when this leaf lock is turned into the slit 13 from the position shown in Fig. 3 to that shown in Fig. 2, the inner and outer arm portions 14 and 15 are forced apart as best illustrated in Fig. 5, thereby binding these inner and outer arm portions tightly upon the threads of the screw 11, thereby serving to prevent the turning or loosening of the screw. The leaf lock 16 is provided with a hooked end portion 18 defining a receiving recess 20 for screw 11, the hooked end of portion 18 passing around that side of the screw 11 that is opposite the side of the screw facing the pin 17 so that the wedging action of the leaf lock is applied to the arm portions 14 and 15 on both sides of and substantially entirely around the screw 11, whereby the threads of the screw are bound completely around their circumference by the inner and outer strap arm portions 14 and 15.

The inner curved surface 19 of the hooked end portion 18 of the leaf lock preferably snugly abuts the surface of screw 11 when the leaf lock is pushed into locking position as shown in Fig. 2, whereby any tendency of screw 11 to loosen, i. e. turn in a clockwise direction as shown in Fig. 2, also tends to draw the leaf lock tighter or further into the slot 13, thereby positively preventing any tendency of the screw to loosen. Owing to the pressure with which the leaf lock binds upon the inner and outer portions 14 and 15 of strap arm, this leaf lock is permanently held in locking position when inserted and will not come out accidently, the same serving to permanently secure the lens screw in fixed position, thereby preventing any looseness of the lens 2 within its mounting.

In use, in assembling a lens with its lens strap, the screw 11 is inserted into aperture 10 of strap arm 8 and through the aperture of the lens and is then screwed into the arm 9 while the leaf lock 16 is out turned, as shown in Fig. 3. The screw 11 is only tightened sufficiently to hold the lens snug and, owing to the presence of the slit or slot 13 the more or less yieldable nature of arm portions 14 and 15 enables the optician to obtain a snug engagement between the lens strap arms and the lens, the arm portions 14 and 15 yielding somewhat if necessary to permit such snug engagement.

After the screw has been thusly adjusted, the leaf lock 16 is manually turned into the slit 13, some pressure being necessarily applied to the leaf lock to accomplish this result. The leaf lock serves to spread arm portions 14 and 15 apart slightly, thereby causing the threads of these portions to grip tightly upon the threads of screw 11 and preventing any possibility of the screw becoming loose. If the optician at any time should desire to replace a lens, he can readily remove the screw 11 by first pushing the leaf lock so as to turn the same out of the slit 13, whereupon the screw 11 may be removed and after inserting the new lens he may again insert the leaf lock 16 into locking position to thereby retain the screw 11 in place. It will be noted that with the leaf lock turned into locking position, the same lies entirely within the confines of the strap arm so as to be invisible and hence does not detract from the appearance of said arm. This is highly desirable from a sales standpoint.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:

1. An ophthalmic mounting for spectacles and eye-glasses comprising a lens strap having arms for engaging opposite sides of the lens, one of said arms having a threaded aperture therethrough for receiving a lens screw and being vertically slitted, thereby providing inner and outer relatively yieldable arm portions, and a leaf lock pivotally mounted within said slit and having tapered surfaces for pressing said arm portions apart to thereby bind the same upon said lens screw.

2. An ophthalmic mounting as in claim 1 wherein said leaf lock is provided with a hooked portion for engaging the surface of said lens screw to aid in locking the latter in fixed position within said lens strap.

3. In an ophthalmic mounting for spectacles and eye-glasses, a lens screw, a lens strap having an arm provided with a threaded aperture for receiving said lens screw, said arm being vertically slitted, whereby said arm is divided into opposed yieldable portions, a pivotal pin carried by said arm and extending across said slit, and a leaf lock of wedge shaped cross-section pivoted on said pin, said leaf lock being turnable from a position substantially exterior of said arm into said slit for spreading said opposed arm portions to thereby bind the same upon said lens screw, said leaf lock being shaped so as to contact said lens screw and arranged so that any tendency for such screw to loosen tends to draw the leaf lock tighter into said slit.

4. In an ophthalmic mounting for spectacles and eye-glasses, a lens screw, a lens strap having an arm provided with a threaded aperture for receiving said lens screw, said arm being vertically slitted, the plane of said slit extending substantially parallel to the inner surface of said arm, whereby said arm is divided into opposed yieldable portions a pivotal pin carried by said arm and extending across said slit, and a leaf lock of wedge shaped cross-section pivoted on said pin, said leaf lock being turnable from a position substantially exterior of said arm into said slit for spreading said opposed arm portions to thereby bind the same upon said lens screw, said leaf lock, when in locking position, being wholly confined within said slit so as to be substantially concealed from view.

HENRY C. PETERSEN.